United States Patent
Kasonde et al.

(10) Patent No.: US 9,975,185 B2
(45) Date of Patent: May 22, 2018

(54) TWIST DRILL TIPS, PRECURSOR CONSTRUCTIONS FOR USE IN MAKING SAME, AND METHODS FOR MAKING AND USING SAME

(75) Inventors: Maweja Kasonde, Oxford (GB); Robert Fries, Gauteng (ZA); John James Barry, Clare (IE); Cornelis Roelof Jonker, Gauteng (ZA)

(73) Assignees: Element Sux Abrasives S.A., Luxembourg (LU); Element Six Limited, County Clare (IE)

( * ) Notice: Subject to any disclaimer, the term of this patent is extended or adjusted under 35 U.S.C. 154(b) by 746 days.

(21) Appl. No.: 14/119,748

(22) PCT Filed: Jun. 12, 2012

(86) PCT No.: PCT/EP2012/061114
§ 371 (c)(1),
(2), (4) Date: Nov. 22, 2013

(87) PCT Pub. No.: WO2012/171915
PCT Pub. Date: Dec. 20, 2012

(65) Prior Publication Data
US 2014/0186132 A1    Jul. 3, 2014

Related U.S. Application Data

(60) Provisional application No. 61/496,414, filed on Jun. 13, 2011.

(30) Foreign Application Priority Data

Jun. 13, 2011  (GB) .................................. 1109864.7

(51) Int. Cl.
*B23B 51/02*    (2006.01)
*B23P 15/32*    (2006.01)
(Continued)

(52) U.S. Cl.
CPC .............. *B23B 51/02* (2013.01); *B23P 15/32* (2013.01); *B22F 2005/001* (2013.01);
(Continued)

(58) Field of Classification Search
CPC .............. B23B 51/02; B23B 2226/125; B23B 2226/31; B23B 2226/315; B23B 2240/08; B23B 2240/11; B23B 2251/02
See application file for complete search history.

(56) References Cited

U.S. PATENT DOCUMENTS

| | | | |
|---|---|---|---|
| 4,713,286 | A | 12/1987 | Bunting et al. |
| 4,762,445 | A | 8/1988 | Bunting et al. |

(Continued)

FOREIGN PATENT DOCUMENTS

| | | |
|---|---|---|
| DE | 20 2007 014367 | 1/2008 |
| DE | 10 2008 049508 A1 | 3/2010 |

(Continued)

OTHER PUBLICATIONS

International Search Report for PCT/EP2012/061114 dated Aug. 27, 2012.

(Continued)

*Primary Examiner* — Sunil K Singh
*Assistant Examiner* — Alan Snyder
(74) *Attorney, Agent, or Firm* — Armstrong Teasdale LLP

(57) ABSTRACT

A tip for twist drill, comprising a super-hard structure joined to a substrate at an interface boundary coterminous with an end of the substrate, the super-hard structure comprising sintered polycrystalline material comprising super-hard grains, the super-hard structure defining a super-hard end surface opposite the interface boundary and a plurality of cutting edges configured for boring into a body in use; the super-hard end surface including a center point or chisel edge, and comprising a plurality of surface regions config-
(Continued)

ured such that respective planes tangential to each of the surface regions are disposed at substantially different angles from the axis of rotation of the tip in use. Precursor constructions for use in manufacturing the tips as well as methods for making the precursor constructions and the tips are disclosed.

18 Claims, 5 Drawing Sheets

(51) Int. Cl.
*C22C 26/00* (2006.01)
*B22F 5/00* (2006.01)

(52) U.S. Cl.
CPC ... *B23B 2226/125* (2013.01); *B23B 2226/315* (2013.01); *B23B 2251/02* (2013.01); *B23B 2251/04* (2013.01); *B23B 2251/18* (2013.01); *C22C 26/00* (2013.01); *Y10T 408/81* (2015.01); *Y10T 428/24802* (2015.01)

(56) References Cited

U.S. PATENT DOCUMENTS

| 5,256,206 | A | 10/1993 | Anthony et al. |
| 5,580,196 | A | 12/1996 | Thompson |
| 5,766,394 | A | 6/1998 | Anderson et al. |
| 6,446,740 | B2 | 9/2002 | Eyre |
| 2008/0080938 | A1 | 4/2008 | Makino |
| 2008/0247899 | A1 | 10/2008 | Cho et al. |
| 2011/0085868 | A1 | 4/2011 | Harouche |
| 2011/0268518 | A1* | 11/2011 | Sampath ................. B23B 51/02 408/59 |
| 2012/0093600 | A1* | 4/2012 | Sampath ................. B23B 51/02 408/225 |

FOREIGN PATENT DOCUMENTS

| EP | 0132652 | A | 2/1985 |
| EP | 0168953 | A | 1/1986 |
| EP | 2047932 | A | 4/2009 |
| GB | 2259263 | A | 3/1993 |
| GB | 2486345 | A | 6/2012 |
| JP | 6508566 | | 9/1994 |
| JP | 2007515302 | | 6/2007 |
| WO | 1997/029877 | A | 8/1997 |
| WO | 02/49801 | A1 | 6/2002 |
| WO | 2005/061838 | A1 | 7/2005 |
| WO | 2006/032984 | A2 | 3/2006 |
| WO | 2007/110770 | A2 | 10/2007 |
| WO | 2010/034410 | A | 4/2010 |
| WO | 2011/089555 | A | 7/2011 |

OTHER PUBLICATIONS

Search Report for GB 1109864.7 dated Oct. 5, 2011.
Search Report for GB 1210330.5 dated Oct. 11, 2012.

* cited by examiner

TWIST DRILL TIPS, PRECURSOR CONSTRUCTIONS FOR USE IN MAKING SAME, AND METHODS FOR MAKING AND USING SAME

This disclosure relates generally to twist drill tips comprising sintered polycrystalline super-hard material, precursor constructions for use in manufacturing same, methods for making the precursor constructions and the twist drill tips, and a method of using the drill tips.

Rotary machine tools such as twist drills comprising super-hard tips may be used to machine hard metals and alloys to make components for the aerospace and other industries. Examples of sintered polycrystalline super-hard materials include polycrystalline diamond (PCD) material and polycrystalline cubic boron nitride (PCBN) material. A twist drill bit comprises a cutter point (or simply "point") at the tip of a cylindrical shaft provided with flutes, which help to remove chips of material out of the hole being drilled.

U.S. Pat. No. 5,256,206 discloses coated a twist drill comprising a uniform diamond coating that covers the head and the flute of the drill. A method for making the coated twist drill includes depositing a diamond coat by means of chemical vapour deposition.

U.S. Pat. No. 5,580,196 discloses a method of manufacturing a twist drill bit comprising the following steps: providing a drill precursor construction having a conical tip; fabricating a drill blank by bonding a layer of PCD or PCBN to substantially the whole surface of the conical tip, the layer having substantially uniform axial thickness; and machining the drill blank to form the twist drill bit. Once again, the drill precursor construction may comprise steel or tungsten carbide or tantalum carbide or similar materials. The thickness of the PCD or PCBN layer is disclosed as being preferably 0.5 to 1.5 mm.

The cost of manufacturing super-hard drill tips is likely to increase substantially the more that machining or grinding of super-hard material is required. Drill bits may be reconditioned from time to time in order to extend their working life. This may be done by grinding the tip, which would require the removal of some super-hard material from the tip. Commercially viable PCD-tipped drill bits may need to be re-ground two to four times, with about 0.2-0.5 mm being removed form the surface each time. Where the PCD structure has the general form of a layer joined to a cemented carbide substrate, it may therefore need to be at least about 2.5 mm or at least about 3 mm thick.

There is a need for super-hard twist drills configured for efficient and effective drilling of bodies comprising hard or abrasive materials, particularly but not exclusively bodies comprising titanium (Ti) and or carbon fibre-reinforced polymer (CFRP). There is also a need for cost effective methods for making the super-hard tips.

Viewed from a first aspect there is provided a tip for twist drill, comprising a super-hard structure joined to a substrate at an interface boundary coterminous with an end of the substrate, the super-hard structure comprising sintered polycrystalline material comprising super-hard grains, the super-hard structure defining a super-hard end surface opposite the interface boundary and a plurality of cutting edges configured for boring into a body in use; the super-hard end surface including a centre point or chisel edge, and comprising a plurality of surface regions configured such that respective planes tangential to each of the surface regions are disposed at substantially different angles from the axis of rotation of the tip in use. The super-hard end surface may be referred to as the cutting point of the tip. Substantially no area of the end of the substrate will be exposed and substantially the entire end of the substrate will be joined to the super-hard structure.

Various combinations and arrangements are envisaged by the disclosure for precursor constructions, non-limiting and non-exhaustive examples of which are described below.

The super-hard structure may define two, three or more cutting edges formed on the super-hard structure. The tip may comprise two or more flutes.

The substrate may comprise or consist essentially of cemented carbide material such as cobalt cemented tungsten carbide material.

The super-hard end surface may have a periphery defining a diameter of at least about 3 millimeters and at most about 20 millimeters. At least part of the periphery may be arcuate. The diameter of the substrate, not including any flutes that may be present, may be at least about 3 millimeters and at most about 20 millimeters.

The super-hard structure may comprise polycrystalline diamond (PCD) material or polycrystalline cubic boron nitride (PCBN) material.

The super-hard structure may have substantially uniform thickness. The super-hard structure may have a mean thickness of at least about 0.5 millimeter and at most about 3 millimeters.

Various arrangements are envisaged for the super-hard end surface and the surface regions thereof, non-limiting examples of which are as follows. The super-hard end surface may be substantially conformal with the interface boundary, apart from any clearance surfaces that may be formed on the super-hard end surface. The super-hard end surface may comprise at least two partial cone surface regions. The super-hard end surface may comprise at least one surface region that is arcuate in a longitudinal plane parallel to the axis of rotation of the tip in use At least two of the surface regions may define an inflection between them. The tangent planes to the surface regions may be disposed at least 5 degrees or at least about 10 degrees with respect to each other. Each of the surface regions may define respective included angles of at least 45 degrees or at least about 60 degrees and at most about 180 degrees or at most about 140 degrees, measured between tangent planes to diametrically opposite areas within each surface region. The super-hard end surface may include a first surface region depending from the apex and a second surface region depending from the first surface region, the first and second surface regions defining an inflection angle between them.

The interface boundary may have a generally frusto-conical, domed, conical, multiply conical, concave or convex shape.

The super-hard structure may be joined to the substrate via at least one intermediate layer comprising a plurality of super-hard grains and carbide grains dispersed in binder material, which may comprise cobalt. The content of the super-hard grains in the intermediate layer may vary with distance from the super-hard structure. For example, the content of the super-hard grains in the intermediate layer may decrease with distance from the super-hard structure (and therefore increase with distance from the end of the substrate). The content of the carbide grains may vary inversely with the content of the super-hard grains in the intermediate layer. The variation of the content of the super-hard grains and or the carbide grains may be substantially continuous or discrete and step-wise. The intermediate layer or layers may have the effect of reducing the internal stress of the super-hard structure and or the substrate.

Viewed from a second aspect there is provided a precursor construction for use in making a tip of according to the first aspect of this disclosure, comprising a super-hard structure joined to a substrate at an interface boundary at an end of the substrate, the super-hard structure defining a super-hard end surface opposite the interface boundary and being free of cutting edges; the super-hard structure comprising sintered polycrystalline material comprising super-hard grains; the super-hard end surface comprising a central blunt apex and the plurality of the surface regions for the tip.

At least the surface regions of the super-hard end surface are configured to correspond to the surface regions of the envisaged tip to be manufactured from the precursor construction. The surface regions of the precursor construction will be substantially the same as those of the tip. This aspect is likely to increase the efficiency of the manufacturing process and reduce the cost, since super-hard material may be expected to be relatively difficult and time consuming to machine Various combinations and arrangements are envisaged by the disclosure for precursor constructions, non-limiting and non-exhaustive examples of which are described below.

In some examples, the surface regions of the precursor construction may correspond to the surface regions of the tip adjacent the cutting edges of the tip. In some examples, the surface regions of the precursor construction are configured such that their profile (particularly when viewed in longitudinal cross section) may be within about 0.5 millimeters or within about 0.3 millimeters of the corresponding profile of the corresponding surface regions of the tip. This aspect is likely to reduce substantially the amount of super-hard material that will need to be removed from the super-hard structure when manufacturing the tip from the precursor construction, since the surface regions of the precursor construction will be configured substantially to match the surface regions of the tip, apart from the formation of clearance faces that may be required or minor processing, for example.

The apex may be spherically blunt and have a radius. The apex may be a rounded ridge having a radius in a plane perpendicular to the ridge. The radius of the apex may be at least about 0.5 millimeter and at most about 3 millimeters, at most about 2 millimeters or at most about 1.5 millimeters.

In some examples, the interface boundary may be substantially coterminous with the end of the substrate and substantially the entire end of the substrate may be joined to the super-hard structure, or an area of the end of the substrate may be exposed.

The super-hard end surface may have a periphery defining a diameter of at least about 3 millimeters and at most about 20 millimeters. The periphery may be substantially circular or at least part of the periphery may be arcuate.

The super-hard structure may comprise polycrystalline diamond (PCD) material or polycrystalline cubic boron nitride (PCBN) material.

The super-hard structure may have substantially uniform thickness of at least about 0.5 millimeter and at most about 3 millimeters.

Various arrangements are envisaged for the super-hard end surface and the surface regions thereof, non-limiting examples of which are as follows. The super-hard end surface may be substantially conformal with the interface boundary. The super-hard end surface may comprise at least two conical surfaces, the conical surfaces being concentric with each other and with the apex, and being disposed at substantially different respective cone angles. The super-hard end surface may comprise an outer conical surface and an inner conical surface, the outer conical surface being further away from the apex than the inner conical surface, the cone angle of the outer conical surface being substantially greater than the cone angle of the inner conical surface. The super-hard end surface may comprise an outer conical surface and an inner conical surface, the outer conical surface being further away from the apex than the inner conical surface, the cone angle of the outer conical surface being substantially less than the cone angle of the inner conical surface. The super-hard end surface may comprise at least one surface region that is arcuate in the longitudinal plane. At least two of the surface regions may define an inflection between them. At least two of the surface regions may meet at a fillet corner defined between them, the fillet having a radius of at least about 0.5 millimeters and at most about 3 millimeters. The tangent planes to the surface regions may be disposed at least 5 degrees or at least about 10 degrees with respect to each other. Each of the surface regions may define respective included angles of at least 45 degrees or at least about 60 degrees and at most about 180 degrees or at most about 140 degrees, measured between tangent planes to diametrically opposite areas within each surface region. The super-hard end surface may include a first surface region depending from the apex and a second surface region depending from the first surface region, the first and second surface regions defining an inflection angle between them.

The interface boundary may have a generally frusto-conical, domed, conical, multiply conical, concave or convex shape.

The super-hard structure may be joined to the substrate via at least one intermediate layer comprising a plurality of super-hard grains and carbide grains dispersed in binder material, which may comprise cobalt. The content of the super-hard grains in the intermediate layer may vary with distance from the super-hard structure. For example, the content of the super-hard grains in the intermediate layer may decrease with distance from the super-hard structure (and therefore increase with distance from the end of the substrate). The content of the carbide grains may vary inversely with the content of the super-hard grains in the intermediate layer. The variation of the content of the super-hard grains and or the carbide grains may be substantially continuous or discrete and step-wise. The intermediate layer or layers may have the effect of reducing the internal stress of the super-hard structure and or the substrate.

Viewed from a third aspect there is provided a method for making a precursor construction according to this disclosure; the method including providing a mould comprising an internal surface area configured for forming the super-hard end surface of the precursor construction; forming an aggregation comprising a plurality of super-hard grains against the internal surface area, providing a substrate comprising cemented carbide material and having an end surface configured as the interface boundary for the construction, placing the end surface of the substrate against the aggregation to provide a pre-sinter assembly; assembling the pre-sinter assembly into a capsule for an ultra-high pressure press and subjecting the pre-sinter assembly to a pressure and temperature sufficient for sintering the aggregation to form the super-hard construction bonded to the substrate.

Variations of the method are envisaged by this disclosure, non-limiting and non-exhaustive examples of which are described below.

The internal surface area of the mould may be configured such that its shape profile (particularly when viewed in longitudinal cross section) is within about 0.5 millimeters or within about 0.3 millimeters of the corresponding shape profile of the super-hard end surface of the precursor construction. The shape of the internal surface area of the mould may be substantially the same as the shape of the super-hard end surface of the precursor construction, apart from inevitable distortion that may occur during the sintering step.

The aggregation may comprise a plurality of diamond grains or a plurality of CBN grains.

The aggregation may be arranged for producing a super-hard structure having substantially uniform thickness of at least about 0.5 millimeter and at most about 3 millimeters.

The mould may be configured for forming a super-hard structure having an end surface including the apex, a first surface region depending from the apex and a second surface region depending from the first surface region; the first and second surface regions defining an inflection angle between them.

The method may include disposing at least one intermediate layer between the aggregation of super-hard grains and the substrate, the intermediate layer comprising grains of super-hard material and grains of a metal carbide material to provide a construction the super-hard structure joined to the substrate via the intermediate layer.

The method may include disposing at least one intermediate layer between the aggregation of super-hard grains and the substrate, the intermediate layer comprising a plurality of super-hard grains and carbide grains dispersed in binder material, which may comprise cobalt. The content of the super-hard grains in the intermediate layer may vary with distance from the aggregation. For example, the content of the super-hard grains in the intermediate layer may decrease with distance from the aggregation (and therefore increase with distance from the end of the substrate). The content of the carbide grains may vary inversely with the content of the super-hard grains in the intermediate layer. The variation of the content of the super-hard grains and or the carbide grains may be substantially continuous or discrete and step-wise.

In some examples, the method may include providing a plurality of sheets comprising the super-hard grains and stacking the sheets against the internal surface of the mould to form the aggregation. In some examples, the method may include preparing a slurry or paste comprising the super-hard grains and forming the slurry or paste by means of casting, extrusion or moulding to provide the aggregation.

Viewed from a fourth aspect there is provided a method for making a tip according to this disclosure, including providing a precursor construction according to this disclosure and removing material from the super-hard structure to form a plurality of cutting edges. The cutting edges will be configured for boring into a body when the tip is driven in use to rotate about an axis of rotation and the tip is driven into the body along the axis of rotation.

In some examples, the method may include removing part of the substrate such that substantially no area of the end of the substrate is exposed and substantially the entire end is joined to the super-hard structure.

The method may include removing material from the precursor construction to provide flute structures.

The method may include removing material from a region of the super-hard structure including the apex to form a centre point or chisel edge.

The method may include removing material from the super-hard structure to reduce or substantially remove the radius of a fillet corner between two surface regions.

The method may include removing material from the super-hard structure to form at least one clearance face on the super-hard end surface. The shape profile of the surface regions of the precursor structure (particularly when viewed in longitudinal cross section) may be substantially preserved, for example to within about 0.5 millimeters or 0.3 millimeters, by the step of forming the clearance surfaces.

Viewed from a fifth aspect there is provided a method of boring into a body comprising titanium (Ti), carbon fibre-reinforced polymer (CFRP) material, or both Ti and CFRP material, the method including using a drill comprising a tip according to this disclosure.

Disclosed example methods may have the aspect of being relatively cost efficient and reducing the amount of processing, particularly of super-hard material required to finish drill tips after sintering the super-hard structure. Disclosed methods may have the aspect of permitting relatively thin and or complex super-hard structures to be provided on relatively high-performance drill tips, including tips having multiple angle points. Some of the disclosed tips may have the aspect of being disposable after a single use, and it may be cost efficient to use them once and not to re-sharpen them for re-use.

Example arrangements will be described with reference to the accompanying drawings, of which:

Figure 3A:
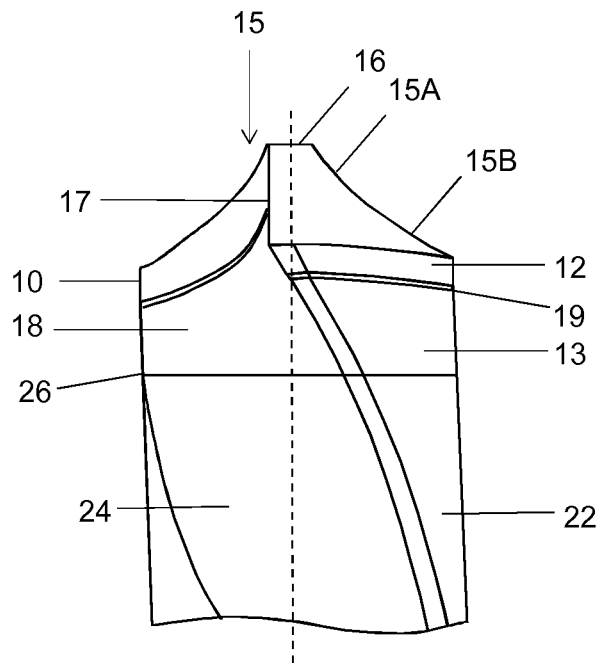
Figure 3B:
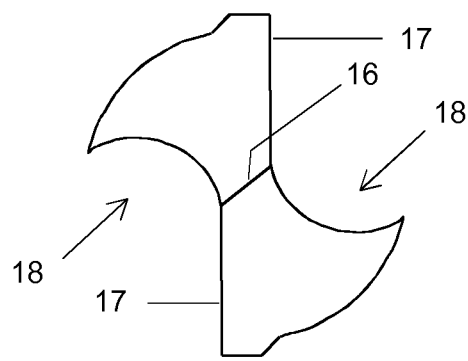
Figure 4:
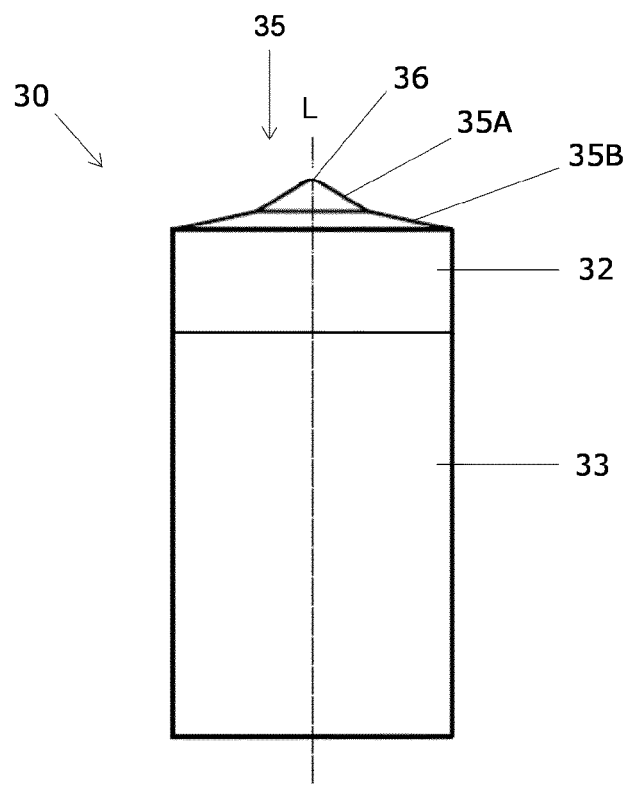
Figure 5:
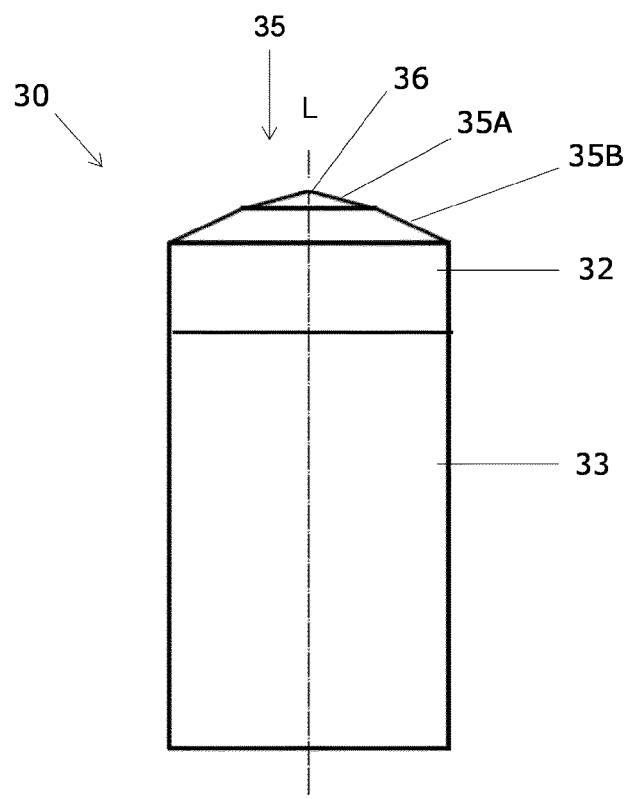
Figure 6:
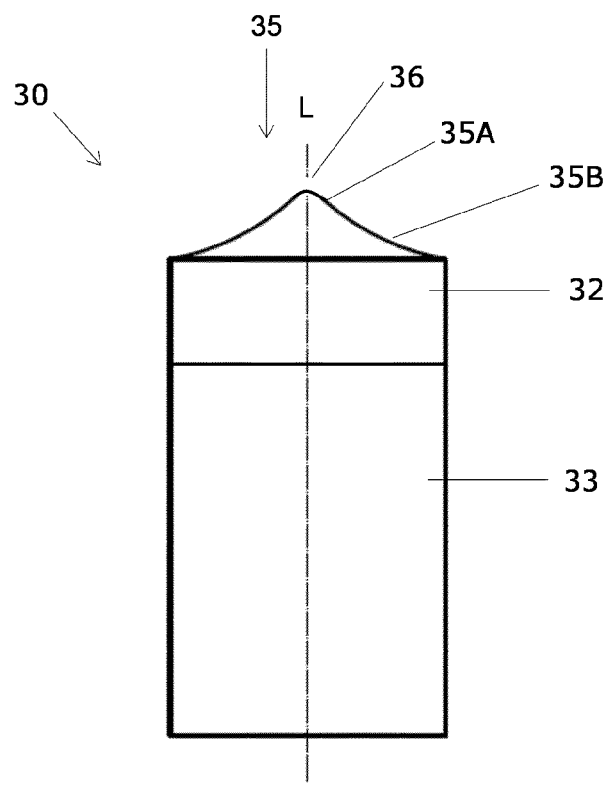
Figure 7:
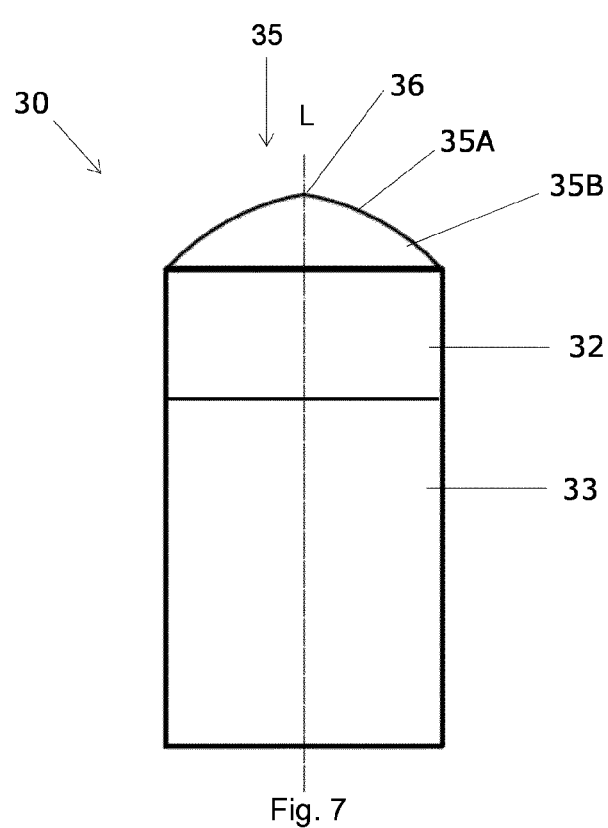

FIG. 3A and FIG. 3B respectively show a schematic side view and a schematic plan view of an end portion of an example twist drill;

FIG. 4 shows a schematic side view of an example precursor construction for a twist drill tip;

FIG. 5 shows a schematic side view of an example precursor construction for a twist drill tip;

FIG. 6 shows a schematic side view of an example precursor construction for a twist drill tip; and FIG. 7 shows a schematic side view of an example precursor construction for a twist drill tip.

Figure 1:
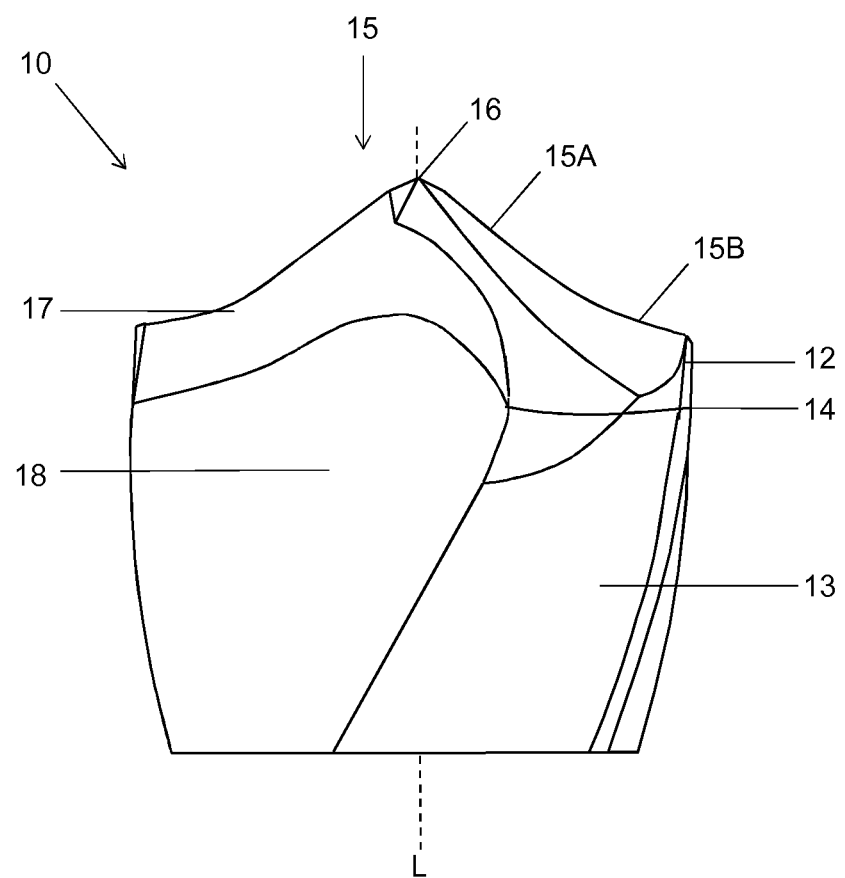
FIG. 1 shows a schematic perspective view of an example tip for a twist drill.

With reference to FIG. 1, an example tip 10 for twist drill (not shown), comprising a super-hard structure 12 joined to a substrate 13 at an interface boundary 14 coterminous with an end of the substrate 13. In this example, the substrate 13 consists essentially of cemented tungsten carbide material and the super-hard structure 12 consists essentially of PCD material. The super-hard structure 12 defines a super-hard end surface 15 opposite the interface boundary 14. The super-hard end surface 15 includes a centre point 16. The super-hard structure 12 defines a pair cutting edges 17 (of which only one is visible in the side view of FIG. 1) and a pair of flutes 18 (of which only one is visible in the side view of FIG. 1) are formed into the tip 10. The super-hard end surface 15 further comprises two generally conical concentric surface regions 15A and 15B disposed at different angles to the longitudinal axis of rotation L of the tip in use, the inner surface region 15A adjacent the centre point 16 having a substantially smaller cone angle than that of the outer surface region 15B. In this particular example, the super-hard end surface 15 is concave and a curved surface region connects the surface regions 15A and 15B. Substantially none of the end of the substrate 13 to which the PCD structure 12 is joined is exposed (i.e. substantially the entire end of the substrate 13 is joined to the PCD structure 12).

Figure 2:
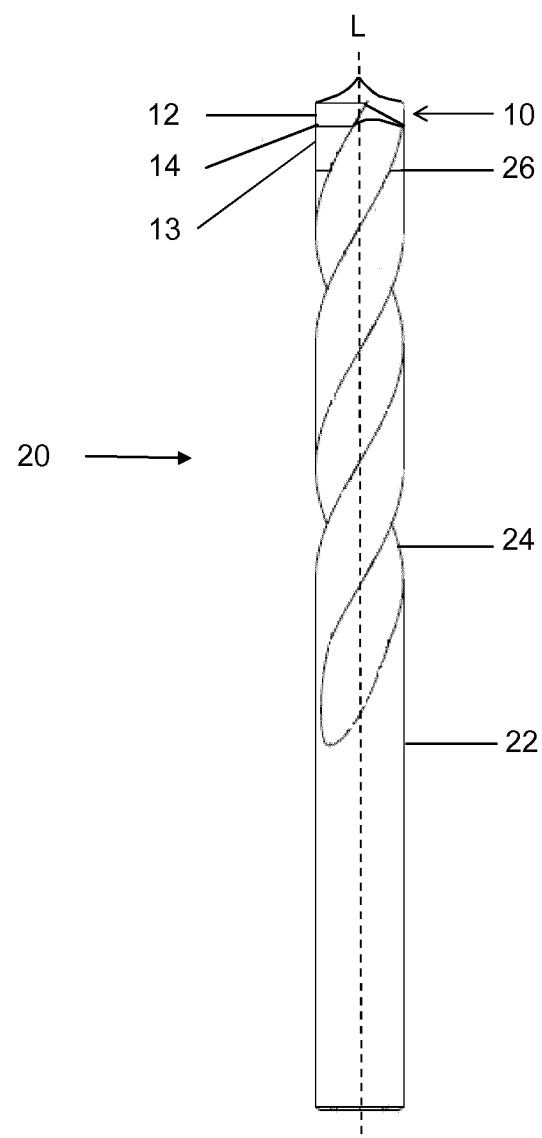
FIG. 2 shows a schematic perspective view of an example twist drill.

With reference to FIG. 2, an example twist drill 20 may comprise a drill shaft 22 having a flute 24, and an example tip 10 joined to an end 26 of the drill shaft 22. The drill shaft 22 defines a longitudinal axis of rotation L. The tip comprises a PCD structure 12 joined to a substrate 13 at an interface boundary 14.

With reference to FIG. 3A and FIG. 3B, an example twist drill (only part of which is shown) comprises a drill shaft 22 comprising at least two flutes 24 (only one of which is visible in FIG. 3A) and an example tip 10 joined to the drill shaft 22 at an end surface 26 of the drill shaft 22. The tip 10 comprises two flutes 18 configured to match the flutes 24 of the shaft 22 at the end 26, and defines two cutting edges 17, each associated with a respective flute 18. The tip 10 comprises a PCD structure 12 joined to a cemented carbide substrate 13 via an intermediate layer 19 comprising diamond grains and carbide grains, the PCD structure 12 defining a cutting point including a chisel edge 16. The PCD structure 12 defines a super-hard end surface 15, which includes concentric, generally conical surface regions 15A and 15B, disposed at different angles to the longitudinal axis of rotation L. In this particular example, the super-hard end surface 15 is concave.

With reference to FIG. 4 and FIG. 5, example precursor constructions 30 for making a twist drill tip (not shown) each comprise a PCD structure 32 joined to a cemented carbide substrate 33 at a respective interface boundary, each of which is substantially conformal with the respective super-hard end surface 35. The PCD structure 32 is configured to have a spherically rounded apex 36 having a radius in a longitudinal plane (parallel to the longitudinal axis L) of about 1 millimeter. The PCD structure 32 defines a super-hard end surface 15 that comprises first and second end conical surface regions 35A, 35B that meet at a circular fillet corner having a fillet radius of about 0.5 millimeters. The surface regions 15A and 15B have substantially different cone angles. In the example shown in FIG. 4, the surface regions 15A, 15B are arranged to form a generally concave end surface 15, and in the example shown in FIG. 5, the surface regions 15A, 15b are arranged to form a generally convex end surface 15.

With reference to FIG. 6 and FIG. 7, example precursor constructions 30 for making a twist drill tip (not shown) each comprise a PCD structure 32 joined to a cemented carbide substrate 33 at a respective interface boundary, each of which is substantially conformal with the respective super-hard end surface 35. The PCD structure 32 is configured to have a spherically rounded apex 36 having a radius in a longitudinal plane (parallel to the longitudinal axis L) of about 1 millimeter. The PCD structure 32 defines a continuously curving super-hard end surface 35 that is arcuate in a longitudinal plane and comprises surface regions 35A, 35B, tangents to which are disposed at different angles to the longitudinal axis L. In the example shown in FIG. 6, the super-hard end surface 35 is concave, in which the surface region 15A adjacent the apex 36 slopes downward from the apex 36 more steeply than the surface region 15B, which is adjacent the periphery of the super-hard end surface. In the example shown in FIG. 7, the super-hard end surface 35 is convex, in which the surface region 15A adjacent the apex 36 slopes downward from the apex 36 less steeply than the surface region 15B, which is adjacent the periphery of the super-hard end surface.

An example method for making an example precursor construction will be described below. The method includes preparing a pre-sinter assembly for making a PCD construction and subjecting the pre-sinter-assembly to an ultra-high pressure of at least about 5.5 GPa and a high temperature of at least about 1,250 degrees centigrade, at which diamond grains are capable of inter-growing to form a PCD structure. The pre-sinter assembly is subjected to an ultra-high pressure, which is likely to result in some distortion of the pre-sinter assembly. The pre-sinter assembly comprises a plurality of diamond grains formed as an aggregation disposed between a cemented carbide substrate and a mould. The mould may comprise a material such as salt or ceramic material, or refractory metal that is suitable for use at PCD sintering conditions. The interior of the mould is configured according to the desired shape of the point of the precursor construction, taking into account anticipated distortion of the pre-sinter assembly during the sintering process in which the PCD structure is formed. The substrate may similarly be configured to reflect this desired shape and consequently the aggregation is constrained to reflect the desired shape of the precursor construction, apart from anticipated distortions. In this example, the aggregation has substantially uniform thickness. Catalyst material for diamond such as cobalt may be introduced into the aggregated mass prior to the application of the ultra-high pressure and or it may be introduced when cobalt material in the cemented carbide substrate melts at the high temperature and infiltrates into the aggregation. When the pre-sinter assembly is subjected to the ultra-high pressure and high temperature for a period of at least several minutes, the diamond grains grow together in the presence of the catalyst material to form the PCD structure that is formed joined to the substrate (i.e. the PCD structure becomes joined to the substrate in the same step in which it becomes a sintered structure), providing a PCD construction in which the PCD structure has an apex defining a centre point for a twist drill, the apex being centrally located on a central longitudinal axis passing through the PCD structure.

The substrate may be provided with an end having substantially the same or similar shape as point of the tip. In some arrangements, a super-hard end surface of the substrate and or the super-hard construction may comprise a portion that is generally frusto-conical, domed, conical, multiply conical, concave or convex.

The mould should be configured to account for distortion arising from the pre-sinter assembly being subjected to the ultra-high pressure and the high temperature, and the shrinkage of the pre-sinter assembly due to the sintering of the super-hard grains. In one arrangement, the pre-sinter assembly may be uni-axially compacted along an longitudinal axis passing through the mould, the plurality of super-hard grains and the substrate, and the mould may tend to flatten. For this reason, the mould may need to be provided with an apex angled at about 3 to 5 degrees less than the desired point angle.

The mould may be configured for forming a super-hard structure having an end surface including the apex, the end surface including a surface inflection. The surface may include two or more regions separated by regions of inflection. In some arrangements, the inflection may be gradual or abrupt, and may be characterised by a inflection angle between the regions on either side of the inflection. The inflection may provide a generally concave or convex point shape.

The method may include subjecting the aggregation in the presence of a catalyst material or binder material for bonding together the super-hard grains to an ultra-high pressure and temperature at which the super-hard material is capable of being sintered.

PCD structures may be made by sintering together an aggregated plurality of diamond grains in the presence of a catalyst material for diamond, for example cobalt, at a pressure and temperature at which the diamond is thermodynamically more stable than graphite. The pressure may be at least about 5 GPa and the temperature may be at least about 1,250 degrees centigrade. In some versions, the pressure may be greater than 6.0 GPa, greater than 7.0 GPa or even least about 8 GPa. The diamond grains may be sintered on a cemented carbide substrate, resulting in a composite compact comprising a PCD structure bonded to the substrate. The substrate may contain a catalyst material such as cobalt and may provide a source of the catalyst material, which may infiltrate among the diamond grains when in the molten state at the pressure and temperature for sintering the PCD material. In one method of making a tip, a pre-composite assembly comprising a precursor sheet or sheets for the intermediate layer or layers interposed between an aggregated plurality of diamond grains and a cemented carbide substrate may be constructed. The pre-cursor assembly may then be subjected to a pressure of at least about 5.5 GPa and a temperature of at least about 1,250 degrees centigrade to sinter the diamond grains and form a unitary body comprising PCD material joined to the substrate via at least one intermediate layer. The unitary body may then be processed by grinding, for example, to produce a precursor construction suitable for further processing to make a tip for a rotary machine tool. A PCD precursor construction may be processed by a method including electro-discharge machining (EDM) and grinding to form flutes and cutting faces of the tip.

In the example method described above, precursor sheets for intermediate layers may comprise diamond grains, carbide grains and metal powder held together by means of a binder material. An example method for making a layered PCD element includes providing tape cast sheets, each sheet comprising a plurality of diamond grains bonded together by a binder, such as a water-based organic binder, and stacking the sheets on top of one another and on top of a support body. Different sheets comprising diamond grains having different size distributions, diamond content and additives may be selectively stacked to achieve a desired structure. The sheets may be made by a method known in the art, such as extrusion or tape casting methods, wherein slurry comprising diamond grains and a binder material is laid onto a surface and allowed to dry. Other methods for making diamond-bearing sheets may also be used, such as described in U.S. Pat. Nos. 5,766,394 and 6,446,740 may be used. Alternative methods for depositing diamond-bearing layers include spraying methods, such as thermal spraying.

When sintering an aggregated mass of diamond grains together to form PCD material, solvent/catalyst material may be introduced to the aggregated mass in various ways. One way includes depositing metal oxide onto the surfaces of a plurality of diamond grains by means of precipitation from an aqueous solution prior to forming their consolidation into an aggregated mass. Such methods are disclosed in PCT publications numbers WO2006/032984 and also WO2007/110770. Another way includes preparing or providing metal alloy including a catalyst material for diamond in powder form and blending the powder with the plurality of diamond grains prior to their consolidation into an aggregated mass. The blending may be carried out by means of a ball mill. Other additives may be blended into the aggregated mass. The aggregated mass of diamond grains, including any solvent/catalyst material particles or additive material particles that may have been introduced, may be formed into an un-bonded or loosely bonded structure, which may be placed onto a cemented carbide substrate. The cemented carbide substrate may contain a source of catalyst material for diamond, such as cobalt. The assembly comprising the aggregated mass of grains and the substrate may be encapsulated in a capsule suitable for an ultra-high pressure furnace apparatus and subjecting the capsule to a pressure of greater than 6 GPa. Various kinds of ultra-high pressure apparatus are known and can be used, including belt, torroidal, cubic and tetragonal multi-anvil systems. The temperature of the capsule should be high enough for the catalyst material to melt and low enough to avoid substantial conversion of diamond to graphite. The time should be long enough for sintering to be completed but as short as possible to maximise productivity and reduce costs.

Example drill point configurations may be generally concavely arcuate or generally convexly arcuate, or may comprise one or more generally conical portions, which may be arranged concavely or convexly. Example drill tips may include a double angle cutting point, which may be characterised by an external angle and an internal angle.

In an example arrangement, the blank or the tip may comprise a super-hard structure joined to a cemented carbide substrate by means of an intermediate layer disposed between the super-hard structure and the cemented carbide substrate, the intermediate layer comprising grains of super-hard material, such as synthetic or natural diamond, or cubic boron nitride (cBN), and grains of a metal carbide material dispersed in a metal binder material.

A non-limiting example arrangement is described in more detail below.

An example PCD construction for making a tip for a twist drill was made, comprising a PCD cap bonded to a cemented carbide substrate via three intermediate layers. The PCD cap had substantially uniform thickness and defined a cutting point, having the general shape of pointed dome, in which a convex arcuate surface forms an apex.

A mould was provided having an internal shape at one end configured with the same general shape as the intended shape of the working surface of the PCD tip precursor construction. In order to take into account the expected distortion during the sintering step, the interior of the mould defined a pointed dome that was about 3 to 5 degrees sharper (i.e. more elongate) than desired for the PCD cap. The mould comprised a cup formed of a refractory metal supported within a capsule comprising salt. PCD precursor sheets comprising diamond grains having mean size of at least about 1 micron and at most about 10 microns and bonded together by means of an organic binder were assembled into the mould, a plurality of sheets being stacked against the shaped end of the mould. Intermediate sheets comprising diamond grains and tungsten carbide grains were stacked against the PCD precursor sheets and a shaped cemented carbide substrate was placed against the intermediate sheets. The substrate had a super-hard end surface and a distal end, the ends connected by a generally cylindrical side surface, the super-hard end surface having a shape consistent with the internal shape of the mould. The substrate comprised about 10 weight percent cobalt and WC grains having a mean size in the range from about 4 microns to about 6 microns.

The compositions of the intermediate sheets S1, S2 and S3 are provided in the table below (excluding the binder material). Each comprised a different composition of diamond and tungsten carbide grains, with S1 also comprising admixed cobalt in powder form. The intermediate sheets and the PCD precursor sheets were formed by means of tape casting slurries comprising the diamond and or the tungsten carbide grains and an organic binder, and allowing the cast slurries to dry.

|    | Diamond     | WC          | Co          |
| -- | ----------- | ----------- | ----------- |
| S1 | 69-75 wt. % | 23-25 wt. % | 0-8 wt. %   |
| S2 | 46-50 wt. % | 46-50 wt. % | 0-8 wt. %   |
| S3 | 18-20 wt. % | 54-61 wt. % | 19-28 wt. % |

The pre-sinter assembly was subjected to heat treatment in a vacuum to burn off substantially all of the organic binder and then assembled into a capsule for an ultra-high pressure furnace. It was then subjected to a pressure of about 5.5 GPa and a temperature of about 1,350 degrees centigrade to sinter the PCD precursor structure to form a PCD end cap joined to the substrate body via three intermediate layers. After the sintering step, the PCD construction was recovered from the encapsulating structure. It comprised a PCD cap formed joined to the substrate via three intermediate layers, the PCD cap having the shape of a dome having a pointed apex.

The PCD construction was processed by means of electro-discharge machining (EDM) and grinding to provide a pair of opposing cutting edges on the end of the PCD cap (to be the cutting point of the drill tip) and a pair of helical flutes on the peripheral side of the construction to form a tip for a twist drill.

Certain terms and concepts as used herein are briefly explained below.

As used herein, "super-hard" or ultra-hard material has Vickers hardness of at least 25 GPa. Synthetic and natural diamond, polycrystalline diamond (PCD), cubic boron nitride (cBN) and polycrystalline cBN (PCBN) material are examples of super-hard materials. Synthetic diamond, which is also called man-made diamond, is diamond material that has been manufactured.

Polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder or filler material comprising catalyst material for synthetic diamond, or they may be substantially empty. A catalyst material for synthetic diamond is capable of promoting the growth of synthetic diamond grains and or the direct inter-growth of synthetic or natural diamond grains at a temperature and pressure at which synthetic or natural diamond is thermodynamically stable. Examples of catalyst materials for diamond are Fe, Ni, Co and Mn, and certain alloys including these. Super-hard structures comprising PCD material may comprise at least a region from which catalyst material has been removed from the interstices, leaving interstitial voids between the diamond grains. PCD structures having at least a significant region from which catalyst material for diamond has been depleted, or in which catalyst material is in a form that is relatively less active as a catalyst, may be described as thermally stable PCD.

PCBN material comprises grains of cubic boron nitride (cBN) dispersed within a matrix comprising metal and or ceramic material. For example, PCBN material may comprise at least about 30 volume percent cBN grains dispersed in a binder matrix material comprising a Ti-containing compound, such as titanium carbonitride and/or an Al-containing compound, such as aluminium nitride, and/or compounds containing metal such as Co and/or W. Some versions (or "grades") of PCBN material may comprise at least about 80 volume percent or even at least about 85 volume percent cBN grains.

A tipped tool is one in which the cutting edge is formed by a cutter tip comprising a different material from that of the rest of the tool or insert, the tip typically being brazed or clamped onto a tool body. A tip for a machine tool may be produced by processing a precursor construction to form it into a configuration for a tip. A twist drill is a fluted drill for drilling holes into work-piece bodies such as bodies comprising metal, wood, composite material and plastic by a rotational shear cutting action, and may comprise a tip.

A twist drill can be described generally as a rotary end cutting tool having one or more cutting faces or lips, and also one or more helical or straight flutes for conveying the chip from a hole being drilled. Chips are the pieces of a work-piece material removed from a work surface of the work-piece by a machine tool in use. A cutting edge of a tip is the edge of a rake face and is intended to perform cutting of a body. A rake face of a machine tool is the surface or surfaces over which chips flow when the tool is used to remove material from a body, the rake face directing the flow of newly formed chips. While some drills have straight flutes, extending parallel to the axis of the tool, most twist drills comprise helical flutes configured subject to design considerations such as the desired rake angle of the cutting edge, the ease of chip evacuation and the stiffness of the drill.

The cutter point (or simply the point) of the drill is the working end of the drill, providing the cutting edges. The point may include a chisel edge that is located symmetrically between the cutting edges, and concentric with an axis of rotation of the drill. In the simplest drills, the chisel edge geometry is determined by the web thickness, being the portion of material that separates the flutes. As the web portion of a drill does not cut work material, but rather extrudes it outwardly from the centreline towards the cutting edges, its length is frequently minimised by forming notches at the intersection between the flutes and the drill point surface. The design of the drill point (web and notch geometry) partially influences its rotational accuracy—i.e. the degree to which the drill rotates concentrically about the guiding mechanisms axis of rotation. Most drills used in the field contain two cutting edges as this is the most economical design. However, it is known that drills comprising three cutting edges, and therefore flutes, are stiffer, experience less deflection during cutting and are therefore capable of producing holes of higher quality and accuracy. Furthermore, the additional cutting edge permits drilling (translational) speeds of up to 50% higher than two-flute drills. Although more expensive to manufacture, the higher performance can offset the higher initial cost.

Rotary machine tools such as drill bits having PCD tips may be used to machine bodies comprising Ti or CFRP, of combinations of Ti and CFRP. A rotary machine tool tip is likely to experience high shear stress acting against the cutting structure in use. The shear stress is likely to be more severe where the body being drilled comprises very strong material, such as Ti or CFRP, or both.

A cone angle is the included angle measured diametrically through a cone between points on the surface of the cone, with the cone apex being the vertex.

A fillet is a concave easing of an interior corner of a part design.

The invention claimed is:

1. A tip for twist drill, comprising
   a super-hard structure joined to a substrate at an interface boundary coterminous with an end of the substrate, substantially the entire end of the substrate being joined to the super-hard structure, substantially no area of the end of the substrate being exposed;

the super-hard structure comprising sintered polycrystalline material comprising super-hard grains, and defining a super-hard end surface opposite the interface boundary and a plurality of cutting edges configured for boring into a body in use, wherein the super-hard end surface is substantially conformal with the interface boundary and the super-hard structure has a mean thickness of between 0.3 and 3 millimeters;

the super-hard end surface comprising a centre point or chisel edge at an apex; a first surface region depending from the apex and a second surface region depending from the first surface region, the first and second surface regions defining an inflection angle between them, and configured such that respective planes tangential to each of the surface regions are disposed at substantially different angles from an axis of rotation of the tip in use and at least 5 degrees with respect to each other.

2. A tip as claimed in claim 1, in which the super-hard structure comprises polycrystalline diamond (PCD) material or polycrystalline cubic boron nitride (PCBN) material.

3. A tip as claimed in claim 1, in which the super-hard end surface comprises at least two partial cone surface regions.

4. A tip as claimed in claim 1, in which the interface boundary is generally frusto-conical, domed, conical, concave or convex in shape.

5. A precursor construction for use in making a tip as claimed in claim 1, comprising a super-hard structure joined to a substrate at an interface boundary at an end of the substrate, the super-hard structure comprising sintered polycrystalline material comprising super-hard grains, and defining a super-hard end surface opposite the interface boundary and being free of cutting edges, wherein the super-hard end surface is substantially conformal with the interface boundary and the super-hard structure has a mean thickness of between 0.3 and 3 millimeters;

the super-hard end surface comprising a central blunt apex and a plurality of surface regions configured for the tip; a first surface region depending from the apex and a second surface region depending from the first surface region, the first and second surface regions defining an inflection angle between them; the tangent planes to the surface regions are disposed at least 5 degrees with respect to each other.

6. A precursor construction as claimed in claim 5, in which the surface regions of the precursor construction are configured such that their profile is within 0.5 millimeters of the corresponding profile of the corresponding surface regions of the tip.

7. A precursor construction as claimed in claim 5, in which the apex has a radius of at least 0.5 millimeter and at most 3 millimeters.

8. A precursor construction as claimed in claim 5, in which the super-hard end surface comprises at least two conical surfaces, the conical surfaces being concentric with each other and with the apex, and having substantially different respective cone angles.

9. A precursor construction as claimed in claim 5, in which the super-hard end surface comprises an outer conical surface and an inner conical surface, the outer conical surface being further away from the apex than the inner conical surface, the cone angle of the outer conical surface being substantially greater than the cone angle of the inner conical surface.

10. A precursor construction as claimed in claim 5, in which the super-hard end surface comprises an outer conical surface and an inner conical surface, the outer conical surface being further away from the apex than the inner conical surface, the cone angle of the outer conical surface being substantially less than the cone angle of the inner conical surface.

11. A precursor construction as claimed in claim 5, in which at least two of the surface regions meet at a fillet corner between them, the fillet having a radius of at least 0.5 millimeters and at most 3 millimeters.

12. A precursor construction as claimed in claim 5, in which the interface boundary has a generally frusto-conical, domed, conical, concave or convex shape.

13. A method for making a tip as claimed in claim 1, including providing a precursor construction comprising a super-hard structure joined to a substrate at an interface boundary at an end of the substrate;

the super-hard structure comprising sintered polycrystalline material comprising super-hard grains and defining a super-hard end surface opposite the interface boundary and being free of cutting edges, wherein the super-hard end surface is substantially conformal with the interface boundary and the super-hard structure has a mean thickness of between 0.3 and 3 millimeters;

the super-hard end surface comprising a central blunt apex and a plurality of surface regions configured for the tip; a first surface region depending from the apex and a second surface region depending from the first surface region, the first and second surface regions defining an inflection angle between them;

wherein the tangent planes to the surface regions are disposed at least 5 degrees with respect to each other; and removing material from the super-hard structure to form a plurality of cutting edges.

14. A method as claimed in claim 13, including removing material from a region of the super-hard structure that includes the apex to form a centre point or chisel edge.

15. A method as claimed in claim 13, including removing material from the precursor construction to provide flute structures.

16. A method as claimed in claim 13, including removing material from the super-hard structure to reduce or substantially eliminate the radius of a fillet corner between two surface regions.

17. A method as claimed in claim 13, the method including removing material from the super-hard structure to form at least one clearance face on the super-hard end surface.

18. A method of boring into a body comprising at least one of titanium (Ti) and carbon fibre-reinforced polymer (CFRP) material, the method including using a drill comprising a tip as claimed in claim 1.

* * * * *